(12) United States Patent
Contant et al.

(10) Patent No.: US 9,715,031 B2
(45) Date of Patent: Jul. 25, 2017

(54) DATA RETRIEVAL DEVICE FOR DOWNHOLE TO SURFACE TELEMETRY SYSTEMS

(75) Inventors: Matthe Contant, Gjettum (NO); Gaelle Jannin, Issy-les-Moullineaux (FR); Erwann Lemenager, Calgary (CA); James G. Filas, Missouri City, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 487 days.

(21) Appl. No.: 13/877,128

(22) PCT Filed: Sep. 29, 2011

(86) PCT No.: PCT/IB2011/054300
§ 371 (c)(1),
(2), (4) Date: May 24, 2013

(87) PCT Pub. No.: WO2012/042499
PCT Pub. Date: Apr. 5, 2012

(65) Prior Publication Data
US 2013/0241742 A1 Sep. 19, 2013

Related U.S. Application Data

(60) Provisional application No. 61/388,004, filed on Sep. 30, 2010.

(51) Int. Cl.
*G01V 3/30* (2006.01)
*E21B 47/12* (2012.01)
(52) U.S. Cl.
CPC .............. *G01V 3/30* (2013.01); *E21B 47/122* (2013.01)

(58) Field of Classification Search
CPC ... G01V 3/30; G01V 3/18; G01V 3/26; G01V 3/28; G01V 3/34; G01V 5/04;
(Continued)

(56) References Cited

U.S. PATENT DOCUMENTS 6,333,700 B1 * 12/2001 Thomeer ................. E21B 23/00
166/254.2
7,080,699 B2 7/2006 Lovell et al.
(Continued)

FOREIGN PATENT DOCUMENTS

EP 0773345 4/2003

OTHER PUBLICATIONS

International Search Report of PCT/IB211/054300 dated Jan. 31, 2013: pp. 1-5.

*Primary Examiner* — Brian Wilson
(74) *Attorney, Agent, or Firm* — Cameron R. Sneddon (57) ABSTRACT

A data retrieval device for communicating between a downhole location within a wellbore (16) and a surface location (22) in which a downhole to surface telemetry system is installed and adapted to communicate between a first telemetry module and a second telemetry module with the second telemetry module (18) positioned downhole and connected to a string (12) positioned within the wellbore (16). The data retrieval device is provided with a housing adapted to be positioned inside the string; a communication device supported by the housing; a connection port positioned on the housing and adapted to be connected to a line; and an electronic module supported by the housing. The electronic module is in communication with the communication device and is adapted to store and use at least an identification parameter of the first telemetry module to intercept a signal
(Continued)

transmission addressed to the first telemetry module from the second telemetry module (18) via the communication device.

27 Claims, 6 Drawing Sheets

(58) Field of Classification Search
CPC ..... G01V 11/002; E21B 47/122; E21B 47/12; E21B 47/121; E21B 17/028
USPC ....... 340/853.1–856.4; 166/66, 254.2, 255.2, 166/241.1, 241.5, 250.01
See application file for complete search history.

(56) References Cited

U.S. PATENT DOCUMENTS

| | | | |
|---|---|---|---|
| 2001/0042617 A1 | 11/2001 | Beck et al. | |
| 2002/0114216 A1 | 8/2002 | Veneruso et al. | |
| 2002/0142721 A1* | 10/2002 | Souissi | H04L 45/04 455/41.2 |
| 2002/0179303 A1* | 12/2002 | Maxit | E21B 47/12 166/369 |
| 2002/0186168 A1* | 12/2002 | Cheah | H01Q 1/38 343/700 MS |
| 2003/0072218 A1 | 4/2003 | Smith | |
| 2003/0098799 A1* | 5/2003 | Zimmerman | E21B 47/122 340/854.6 |
| 2006/0244628 A1* | 11/2006 | Bausov | G01V 11/002 340/854.8 |
| 2007/0288069 A1* | 12/2007 | Goscha | A61B 5/0031 607/60 |
| 2009/0189777 A1* | 7/2009 | Johnson | E21B 47/12 340/853.7 |
| 2011/0158050 A1 | 6/2011 | Merino et al. | |

\* cited by examiner

DATA RETRIEVAL DEVICE FOR DOWNHOLE TO SURFACE TELEMETRY SYSTEMS

TECHNICAL FIELD

The present invention relates generally to a data retrieval device adapted to communicate with telemetry systems used with installations in oil and gas wells or the like. More particularly, but not by way of limitation, the present invention relates to a data retrieval device for transferring data and control signals between a location down a borehole and the surface, or between downhole locations themselves.

BACKGROUND

As oil and gas wells are drilled in deeper waters and into increasingly deeper formations, the costs to explore, drill, and complete such wells increases at an alarming rate. As such, it becomes increasingly valuable to evaluate the well as early and as frequently as possible in an effort to ensure that production upon completion is maximized.

An important factor in such evaluation throughout the life of the well is reliably communicating measured data between a location down a borehole and the surface. It is desirable to communicate data generated downhole to the surface during operations such as drilling, perforating, fracturing, and drill stem or well testing, such as reservoir evaluation testing, pressure and temperature monitoring; and during production operations. Communication is also desired to transmit intelligence from the surface to downhole tools or instruments to effect, control or modify operations or parameters.

Accurate and reliable downhole communication is particularly important when complex data comprising a set of measurements or instructions is to be communicated, i.e., when more than a single measurement or a simple trigger signal has to be communicated. For the transmission of complex data it is often desirable to communicate encoded analog or digital signals. One example of a situation where complex data is generated downhole is during Drill Stem Testing (DST). A DST string is a temporary completion containing all the tools necessary to perform pressure transient analysis of a reservoir, e.g., gauges, sensors and the like.

One approach which has been widely considered for borehole communication is to use a direct wire connection ("wireline") between the surface and the downhole location(s). In such cases, wiring is usually provided in the wireline to transmit signals between the surface and the downhole location(s). The wireline can provide power to the downhole instruments, and also control signals to control the operation of the instruments. The wireline can be used to provide a wired communications link for the telemetry of signals between the surface and the downhole location.

Wireless communication systems have also been developed for purposes of communicating data between the downhole location and the surface of the well. These techniques include, for example, communicating commands downhole via (1) pressure or fluid pulses; (2) acoustic communication; and, (3) electromagnetic waves.

Mud pulse telemetry systems function to vary the pressure of mud flowing through the bore of the string and up through the borehole annulus. Such systems may operate a series of valves to selectively communicate the bore and annulus pressures to either add positive pressure pulses to returning drilling mud (positive pulse telemetry) or to add negative pressure pulses to returning drilling mud (negative pulse telemetry).

Acoustic telemetry, on the other hand, uses an oscillator-type device (e.g., piezoelectric transducer) to generate an acoustic signal that is to modulate along the string or through the wellbore fluid. Additionally, acoustic telemetry may be used to provide wireless bi-directional telemetry for transferring information from the surface to the downhole location and vice-versa.

Electromagnetic telemetry systems use a downhole transmitter to send electromagnetic waves ("EM signals") from the wellbore, up through the string, the casing, the wellbore fluid, and/or the formation adjacent the wellbore, to a receiver located at, or near, the surface of the well. As in the acoustic telemetry systems, electromagnetic telemetry may also be used to provide bi-directional telemetry between the surface and downhole. Such systems include a downhole unit, e.g., a downhole telemetry module that creates an electromagnetic field capable of sending a signal to a remote surface unit or to one or more repeaters positioned between the downhole unit and the surface unit. Advancements, such as the use of repeaters and non-conductive gaps, have been implemented to improve the operability of electromagnetic systems in oilfield applications.

Common methods of implementing an electromagnetic telemetry system involve creating a gap, or non-conductive insert, between adjoining sections of the string and then generating a difference of potential between the two sides of the non-conductive gap. This creates a current that propagates along the string to the surface. An electromagnetic field created by the current propagates a communication signal between a downhole location and the surface, or between downhole locations themselves. Although a generally desirable method of communicating, electromagnetic telemetry also suffers from certain limitations which can limit its application in certain circumstances.

For example, because the communication range of electromagnetic telemetry is highly dependent on current propagation, the reliability and range of communication can be significantly limited when communicating in an area with a low resistivity. For example, the resistivity of the toolstring, the wellbore fluid, the casing, and the formations surrounding the wellbore can affect the electromagnetic signal propagation. In particular, unforeseen formation layers with low resistivity can prevent the electromagnetic signal from reaching the surface, thereby disrupting or even preventing communication between the surface and the downhole location.

Another limitation of electromagnetic telemetry is the effective communication rate. That is, the transfer rate of data can be too slow to communicate data in real time. Generally, systems utilizing electromagnetic systems to transfer data, e.g., data relating to sensed downhole parameters and the like, only transmit a sampling of the data, rather than the complete set of data. These systems often rely on memory modules downhole to record the data which is then downloaded once the tool is recovered to the surface. It would be desirable to obtain the complete set of downhole data, and obtain the complete set of downhole data at a higher transfer rate.

Despite the efforts of the prior art, there exists a need to ensure reliable communication of data between a downhole location and a surface location.

BRIEF DISCLOSURE

In one version, the present invention is directed to a data retrieval device for communicating between a downhole location within a wellbore and a surface location in which a downhole to surface telemetry system is installed and adapted to communicate between a first telemetry module and a second telemetry module with the second telemetry module positioned downhole and connected to a string positioned within the wellbore. The first telemetry module can be either positioned downhole or at the surface. In general, the data retrieval device comprises a housing adapted to be positioned inside the string; and a communication device supported by the housing. The data retrieval device further includes a connection port that is positioned on the housing. The connection port is adapted to be connected to a line wherein the line can be used to lower and raise the data retrieval device into and out of the string. The electronic module is supported by the housing. The electronic module is in communication with the communication device and wherein the electronic module is adapted to store and use at least an identification parameter of the first telemetry module to intercept a signal transmission addressed to the first telemetry module from the second telemetry module via the communication device.

The first telemetry module and the second telemetry module of the downhole to surface telemetry system can communicate via any suitable communication scheme such as electromagnetic communication, or acoustic communication. In either case, the communication device of the data retrieval device is preferably adapted to communicate with the second telemetry module in the same manner that the second telemetry module is adapted to communicate with the first telemetry module such that the data retrieval device in essence mimics the first telemetry module. For example, when the first telemetry module and the second telemetry module communicate via the electromagnetic communication, then, the communication device can be implemented as a non-conductive gap-type communication device, or as an inductive loop coupling communication device. In one embodiment, the first telemetry module and the second telemetry module are each identified by an identification parameter, such as an address.

In one aspect of the data retrieval device, the housing further comprises at least one retaining member that is positioned on the housing. The retaining member is adapted to mechanically secure the data retrieval device at a zone of interest within the string.

In another aspect of the data retrieval device, the connection port can be connected to a wireline having a power link and a communication link to supply power and communication resources to the data retrieval device. Alternatively, the connection port can be connected to a slickline.

When the connection port of the data retrieval device is connected to a slickline that may not provide power and/or communication resources to the data retrieval device, the data retrieval device can further comprise a power supply that provides power to the electronic module. Additionally, the electronic module of the data retrieval device can further include one or more memory modules that are adapted to store the data received from the downhole telemetry module.

In another aspect of the data retrieval device, the data retrieval device can be inserted into a string with a line wherein the data retrieval device is positioned within a wellbore such that the data retrieval device is in electromagnetic communication with the second telemetry module connected to the string and communicating with one or more sensors sensing a wellbore property.

In yet another aspect, the data retrieval device can be positioned at a zone of interest within the wellbore and secured thereto using the at least one retaining member.

In another aspect of the data retrieval device, the connection port can be connected to a line embodied as a wireline. Using the wireline, the data retrieval device facilitates communication between a surface telemetry module and the second telemetry module. The first telemetry module can be the surface telemetry module.

In another version, a data retrieval system is disclosed. The data retrieval system comprises first and second telemetry modules with the second telemetry module connected to a string and positioned downhole within a wellbore. The second telemetry module can be in communication with one or more sensors sensing a wellbore property. The second telemetry module is adapted to receive from the one or more sensors information indicative of the wellbore property. The first and second telemetry modules are adapted to communicate.

In that version, the data retrieval device comprises a housing; and a communication device supported by the housing. The housing is adapted to be positioned inside the string. The data retrieval device further includes a connection port that is positioned on the housing. The connection port is adapted to be connected to a line wherein the line can be used to lower and raise the data retrieval device into and out of the string. The electronic module is supported by the housing and adapted to store and use an identification parameter of the first downhole telemetry module to intercept the signal transmission addressed to the first downhole telemetry module from the second downhole telemetry module via the communication device.

In yet another aspect, the present invention is a data retrieval method for communicating between a downhole location within a wellbore and a surface location in which a downhole to surface telemetry system is installed and adapted to communicate (e.g., electromagnetically or acoustically) between a downhole telemetry module connected to a string positioned with the wellbore and a surface telemetry module. In this method, a data retrieval device is inserted with a line into the string such that the data retrieval device is in communication with at least one of a repeater and the downhole telemetry module of the downhole to surface telemetry system.

The data retrieval device can include a housing having at least one retaining member adapted to mechanically secure the data retrieval device at a zone of interest within the string. In this version, the step of inserting the data retrieval device within the string further comprises the steps of positioning the data retrieval device at a zone of interest; and securing the data retrieval device at the zone of interest using the at least one retaining member.

The line can be embodied as a wireline or a slickline. When the line is a wireline, the method further comprises the step of establishing communication between the surface telemetry module and the at least one of the repeater and downhole telemetry module, via the line and the data retrieval device. When the line is a slickline, the data retrieval device further comprises a power supply supplying power to an electronic module of the data retrieval device and a memory module adapted to store information received from one or more sensors indicative of the wellbore property.

The downhole to surface telemetry system is preferably adapted to function exclusive of the data retrieval device and the data retrieval device is used as a backup to ensure that data being generated by a downhole telemetry module can be received at the surface. It is envisioned that the communication ability of the downhole to surface telemetry system will be tested or monitored in real-time prior to the step of inserting the data retrieval device into the string. In this regard, the step of inserting the data retrieval device can be accomplished responsive to the real-time downhole to surface telemetry system not functioning properly.

These, together with other aspects, features, and advantages of the present invention, along with the various features of novelty, which characterize the invention, are pointed out with particularity in the claims annexed to and forming a part of this disclosure. The above aspects and advantages are neither exhaustive nor individually or jointly critical to the spirit or practice of the invention. Other aspects, features, and advantages of the invention will become readily apparent to those skilled in the art from the following detailed description in combination with the accompanying drawings, illustrating, by way of example, the principles of the invention. Accordingly, the drawings and description are to be regarded as illustrative in nature, and not restrictive.

BRIEF DESCRIPTION OF THE SEVERAL VIEWS OF THE DRAWINGS

Implementations of the invention may be better understood when consideration is given to the following detailed description thereof. Such description makes reference to the annexed pictorial illustrations, schematics, graphs, drawings, and appendices. In the drawings.

DETAILED DESCRIPTION

Specific embodiments of the present invention will now be described in detail with reference to the accompanying Figures. Like elements in the various Figures are denoted by like reference numerals for consistency.

In the following detailed description of embodiments of the present invention, numerous specific details are set forth in order to provide a more thorough understanding of the present invention. However, it will be apparent to one of ordinary skill in the art that the present invention may be practiced without these specific details. In other instances, well-known features have not been described in detail to avoid unnecessarily complicating the description.

Figure 1:
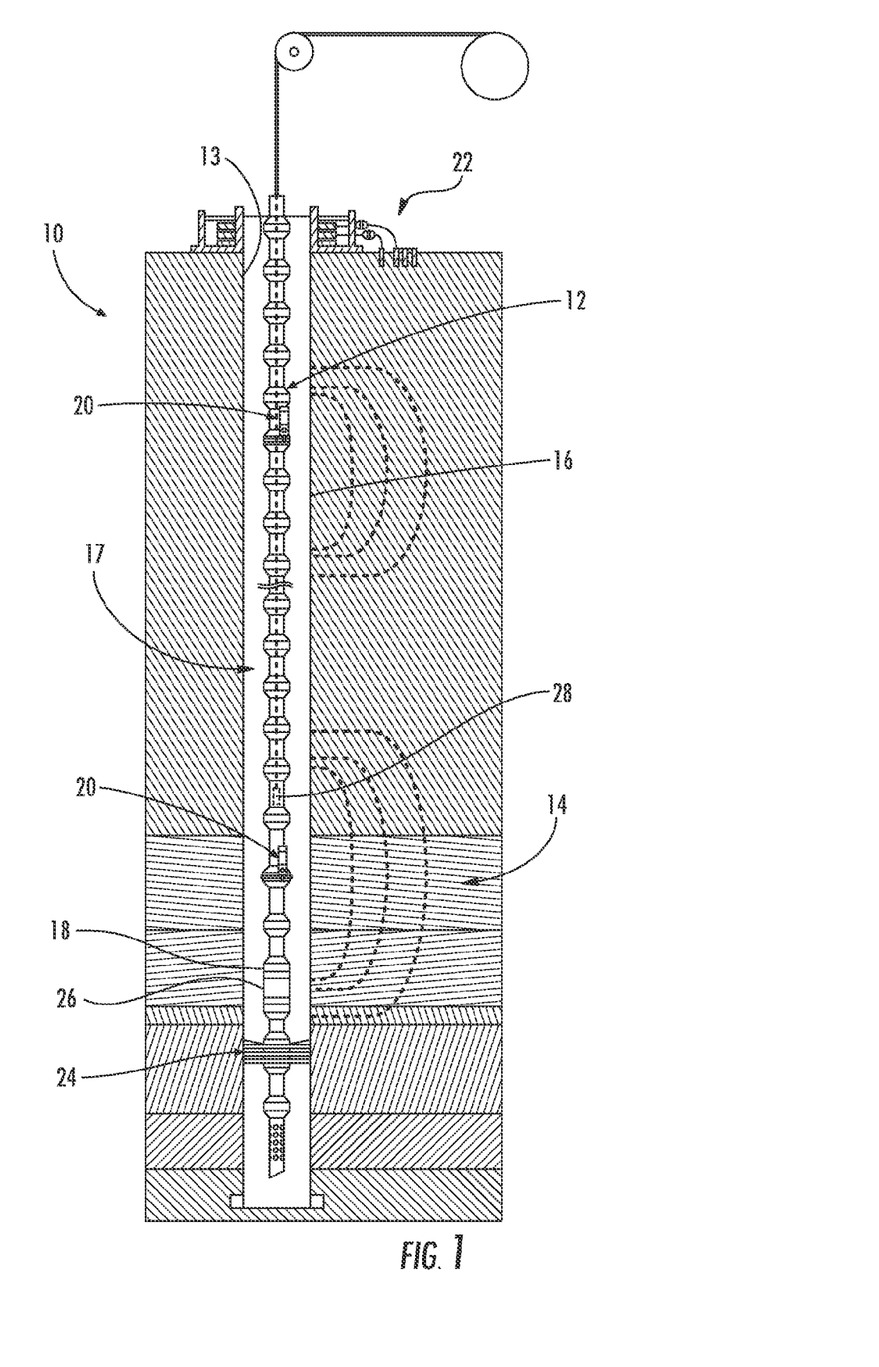
FIG. 1 shows a wellbore operation having a string employing a downhole electromagnetic telemetry system wherein a data retrieval device is positioned in the string and shown in relief.

Turning now to FIG. 1, shown therein is a wellbore operation 10 having a string 12 extending downhole within a wellbore 13 for reservoir characterization and measurement. Depending on the application, string 12 may be a drilling string, a string of completion tools, a production string, a workover string, or any other string to be sent downhole. Generally, when a hole is drilled into the earth, the walls of the surrounding formation 14 may be lined with a casing 16 to prevent the wellbore 13 from collapsing and to (selectively) isolate the formation 14 from the wellbore 13 of the drilled well. Casing 16 may be metallic or any other material (e.g., composite) that is potentially more electrically conductive than the surrounding formation 14. The surrounding formation 14 may be comprised of different layers of rock, sand, and clay that may contain fluids, i.e., liquids or gases. In an oil well, tools may be located upon the string 12 of drill pipe that extends downhole at the desired depth for taking measurements. Similarly, in completed wells, measurement devices may be located upon a string of production tubing extending through the cased wellbore across various zones of the formation.

FIG. 1 also shows a bi-directional downhole to surface telemetry system 17 for communicating between the surface and downhole tools, gauges, sensors, or combinations thereof. The downhole to surface telemetry system 17 can be based on the principle of Extremely Low Frequency "EM" signal modulation and transmission. The downhole to surface telemetry system 17 typically operates in the frequency range of 0.25 to 8 Hz and may target a range of 3000 meters in onshore and offshore environments. As discussed above, the downhole to surface telemetry system 17 typically involves creating a gap, or non-conductive insert, between adjoining sections of the string 12 and then generating a difference of potential between the two sides of the non-conductive gap. This creates a current that propagates within the wellbore 13, the surrounding formation 14, and generally along the string 12 and the casing 16 to the surface.

One method of creating the gap, or non-conductive insert, between adjacent sections of the string 12 includes inserting a gap collar between the adjacent sections of the string 12. The gap collar can include a first collar that has a first end connection and a second collar that has a second end connector. The second end connector can be matingly connectable to the first end connector. A non-conductive insulation coating can be disposed on the first end connector, the second end connector, or combinations thereof. The non-conductive insulating coating can define a gap that electrically insulates the first and second end connectors. The gap collar can also include a non-conductive insulation molding extending across the gap and conforming to the shape of the gap. Such a system of implementing a gap, or non-conductive insert between adjacent sections of a string 12 is described in U.S. Pat. No. 7,080,699, issued on Jul. 25, 2006, to Lovell et al., which is also assigned to the assignee of the present invention.

As shown in FIG. 1, the downhole to surface telemetry system 17 includes a downhole telemetry module 18, one or more repeaters 20 and a surface telemetry module 22. The downhole telemetry module 18 (also referred to in the art as a 'hub') may be placed downhole with downhole tools, e.g., packer 24, valves, samplers, gauges 26, sensors, drilling bit, or combinations thereof. In FIG. 1, one or more repeaters 20 may be used to extend the range of transmission of the EM signals between the surface telemetry module 22 and the downhole telemetry module 18 along the string 12 and the casing 16. The one or more repeaters 20 and/or the surface telemetry module 22 can be referred to herein as a "first telemetry module". The downhole telemetry module 18 can be referred to herein as a "second telemetry module". The EM signal can carry encoded information to be communicated to and from the surface location and downhole tools, gauges and the like. The downhole to surface telemetry system 17 can be implemented using any suitable communication medium. Examples of suitable communication mediums include electro-magnetic signals as well as acoustic signals.

In one or more embodiments, an EM signal may be sent from the surface telemetry module 22 to a repeater 20 in the string 12. The repeater 20 may then relay the message via zero or more additional repeaters 20 until the signal reaches the downhole telemetry module 18 of the downhole to surface telemetry system 17. This type of communication can be useful when formation resistivity is low, as the signal attenuation increases and the telemetry range decreases. In this scenario, the use of repeaters 20 may be necessary to reach the downhole telemetry module 18. Although two repeaters 20 are shown in FIG. 1, it is to be understood that a typical downhole to surface telemetry system 17 can include any number of repeaters 20 as needed to provide communication.

The downhole telemetry module 18, the repeater 20 and the surface telemetry module 22 (referred to herein generally as telemetry module(s)) are each identified by at least one identification parameter. It is useful for the downhole telemetry module 18, the repeater 20 and the surface telemetry module 22 to know various data regarding the other telemetry modules so that such telemetry modules can efficiently communicate. For example, knowledge of the nearest neighbor in a testing pipe string is useful to be energy-efficient and to find the shortest path between the surface and the other telemetry modules. Typically, the telemetry modules communicate with the other telemetry modules on a hop to hop basis wherein each of the telemetry modules communicate with its closest and/or nearest neighbor. For example, in the example shown the downhole telemetry module 18 communicates with the repeater 20, and the repeater 20 communicates with the surface telemetry module 22.

The downhole telemetry module 18, the one or more repeater 20 and the surface telemetry module 22 can be programmed with configuration information including the identification parameter of the nearest neighbor (1) at the surface before the downhole telemetry module 18, and/or the one or more repeater 20 are placed downhole, and/or (2) automatically utilizing a network discovery algorithm for automatically discovering configuration information including the identification parameter. The advantage to using the network discovery algorithm is that a field engineer does not have to rely on a perfect order of placement for each of the downhole telemetry module 18 and/or the repeater 20 to know the identity of their nearest neighbor and thereby ensure a reliable network of communication. Exemplary network discovery algorithm(s) are described in detail in the United States patent application identified by U.S. Ser. No. 12/647,574.

In either case, each of the downhole telemetry module 18 and/or the one or more repeaters 20 is configured independently with configuration information to communicate within the downhole to surface communication system 17. Exemplary configuration information includes (1) the topology of the downhole to surface communication system 17; (2) a receiver frequency (such as 0.25, 0.5, 1, 2, 4, 8 Hz, default is 1 Hz)); (3) the receiver initial delay; (4) the transmitter output current; (5) the communication mode, and (6) a connected pressure recorder parameter, such as a main recorder, safety recorder, safety threshold.

The topology of the downhole to surface communication system 17 includes various information including, but not limited to, an identification parameter for each telemetry module to use when receiving and decoding signals from the other telemetry modules, the number of repeaters 20, and identification parameters for upper and lower neighbors (preferably selected from a list of identification parameters defined in tool string specifications). The receiver initial delay before recording starts can be a positive integer equal to a time interval in minutes between acquisition start and beginning of raw data recording. The default value for the receiver initial delay can be 0. The transmitter output current can be any suitable value such as 5, 10, 15, 20, 25, and/or 30 amps. The default value for the transmitter output current can be 30 amps. With respect to the communication mode, once in the wellbore, the telemetry modules can either be in a command/response mode where the telemetry module can answer requests sent from the surface, or in an automatic mode where the telemetry module sends messages at programmed times. The communication mode can also include durations of those two alternative modes. The one or more repeater 20 is preferably always in the command/response mode.

The above description of the downhole to surface telemetry system 17 is provided for illustration purposes only and is not to be considered limiting. Specific embodiments and/or variations of the downhole to surface telemetry system 17 are known in the art and their use is considered within the scope of the presently described and claimed concepts.

Although the above described downhole to surface telemetry system 17 generally functions to provide communication between the surface telemetry module 22 and the downhole telemetry module 18, there are certain situations which render the downhole to surface telemetry system 17, with or without the above described one or more repeaters 20, unusable or of limited effectiveness. Under certain conditions, the resistivity of the environment in which the downhole to surface telemetry system 17 is intended to operate is such that the EM signal is unable to propagate completely between the downhole telemetry module 18 and the surface telemetry module 22. For example, the resistivity of the string 12 and the casing 16 can affect the EM signal propagation, and in particular, the resistivity of the wellbore fluid and the surrounding formation can significantly affect the EM signal propagation in such a manner as to render communication via the downhole to surface telemetry system 17 not functioning properly and is thereby unusable, or unusable for its intended purpose. A variety of factors can cause the downhole to surface telemetry system 17 to not function properly, such as a broken repeater, low formation resistivity since the signal amplitude significantly diminishes in low resistivity zones, a high level of noise (i.e., a low signal to noise ratio), or the string 12 coming into contact with the casing 16.

To determine whether the downhole to surface telemetry system 17 is not functioning properly, the operator would usually receive an error message at the surface that the signal is weak, or that there is no communication at all. In this event, the operator may first determine if communication was ever initially established, and/or run an error check, such as using a test referred to in the art as a circular redundancy check. In such a circumstance, it is desirable to have a data retrieval device that can be inserted into the string 12 in real-time to thereby re-establish communication between the downhole telemetry module 18 and a surface location, such as the surface telemetry module 22. It is to such a data retrieval device that the presently described and claimed concepts are directed. The term "real-time" as used herein means a process of monitoring current event(s) and taking a corrective measure within an action latency timeframe. An example of monitoring current events can be the testing or monitoring of the data rate of the downhole to surface telemetry system 17 and an exemplary corrective measure can be inserting the data retrieval device into the string 12 to re-establish communication or increase the data rate between the downhole telemetry module 18 and the surface location. The action latency is the time taken to react to the information and take action and can be from minutes to days or weeks or months depending upon the current use of or location of the wellbore operation 10, as well as the availability of the data retrieval device.

Figure 2:
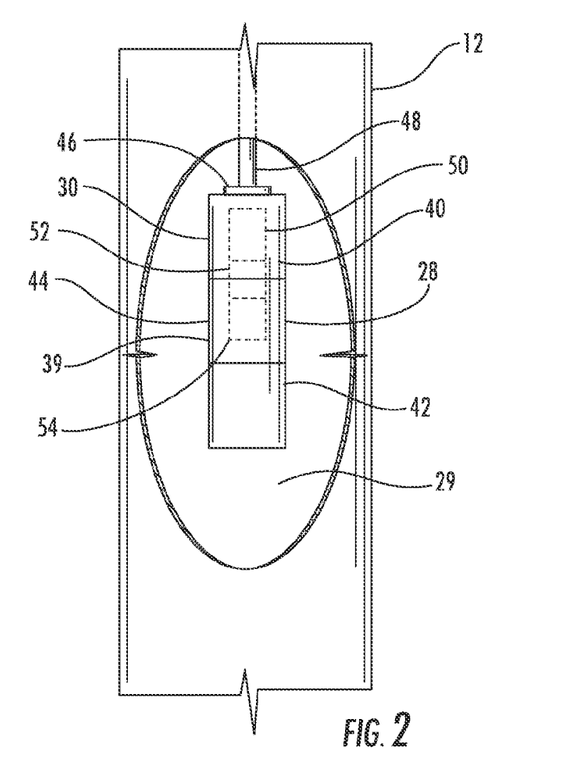
FIG. 2 depicts an enlarged view of a portion of the wellbore operation shown in FIG. 1 with a portion of the string cut-away to show the data retrieval device positioned in the string in greater detail.

Shown in relief in FIG. 1, and also shown in FIG. 2, is an exemplary data retrieval device 28 constructed in accordance with the present invention. The data retrieval device 28 is adapted to be inserted inside the string 12, rather than being a part of the string 12, and extended down a portion of the string 12 to thereby establish communication with the downhole telemetry module 18, or, alternatively, with at least one of the repeaters 20. In a situation where formation or structural resistivity is such that the EM signal propagation between the downhole telemetry module 18 and the surface telemetry module 22 and/or one or more of the repeaters 20 is interrupted, the data retrieval device 28 can be lowered into the string 12 to thereby establish communication with either the downhole telemetry module 18, or, if applicable, one or more of the repeaters 20 operating as a part of the downhole to surface telemetry system 17. Once the data retrieval device 28 is positioned in the string 12 an effective distance to receive the EM signals, for example, transmitted from the downhole telemetry module 18, the data retrieval device 28 is adapted to decode the information encoded in the EM signal and then process that information, as is described in more detail below. For example, in the situation where the wellbore operation 10 included a downhole telemetry module 18 communicating with the surface telemetry module 22 via a plurality of repeaters 20, and the resistivity of the formation or environment was such that the EM signals were only able to propagate up to the third repeater 20 in a line of ten repeaters 20, for example, then the data retrieval device 28 can be lowered into the string 12 within an effective distance from the third repeater 20 to thereby re-establish communication between the downhole telemetry module 18 and the surface.

The data retrieval device 28 is adapted to intercept a signal addressed to a telemetry module, e.g. the downhole telemetry module 18, one of the repeaters 20, or the surface telemetry module 22 of the existing downhole to surface communication system 17. Consequently, to establish a bi-directional communication between the telemetry module and the data retrieval device 28, the data retrieval device 28 stores and uses the same identification parameter, such as an address or data regarding the nearest neighbors of the telemetry module that the data retrieval device 28 is replacing. In other words, the data retrieval device 28 mimics a telemetry module in the downhole to surface communication system 17 to form a bi-directional wireless communication link with at least one downhole telemetry module, such as the downhole telemetry module 18, or one of the repeaters 20. The data retrieval device 28 can be programmed at the surface to have the configuration of the telemetry module that the data retrieval device 28 is replacing, or the configuration can be determined automatically using a network discovery algorithm.

The network discovery algorithm can be implemented in a variety of manners, such as by determining the depth where the data retrieval device 28 is located and looking up configurations of the telemetry module(s) in the downhole to surface communication system 17 from a table, for example. Or, the data retrieval device 28 can be adapted to receive an identification parameter from at least one other telemetry module(s) indicative of the telemetry module(s) nearest neighbor(s) and/or data indicative of at least one local sensor measurement related to the depth of the other telemetry module below the surface of the Earth, to determine the identification parameter of the nearest neighbor that the data retrieval device 28 is replacing, e.g., the relative position of the data retrieval device 28 with respect to the other telemetry module(s).

Preferably the data retrieval device 28 determines or is programmed with the following information to mimic one of the telemetry modules, e.g. the downhole telemetry module 18, or one of the repeaters 20: the topology of the downhole to surface communication system 17; the receiver frequency; and the transmitter output current—all of which are discussed above.

Figure 2A:
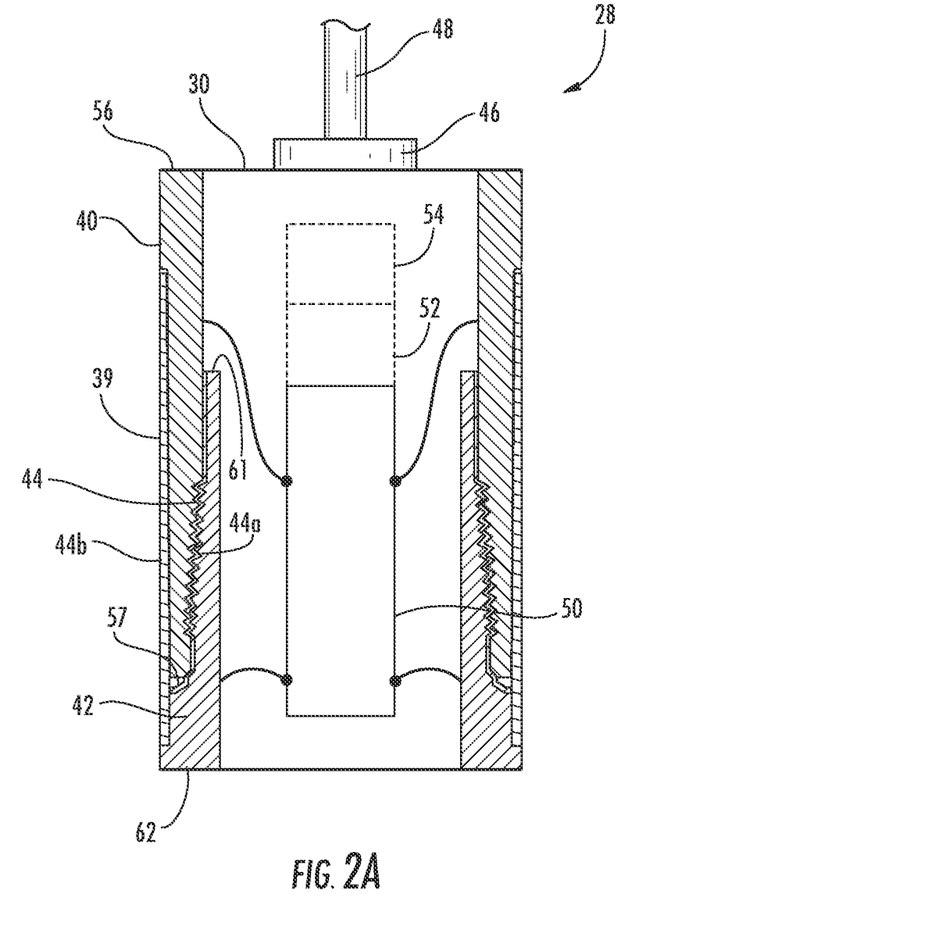
FIG. 2a depicts a cross-sectional diagrammatic view of one embodiment of the data retrieval device shown in FIG. 2.

Referring now to FIGS. 2 and 2a, and in particular FIG. 2a, shown therein in greater detail is the data retrieval device 28 constructed in accordance with the presently disclosed and claimed concepts. The data retrieval device 28 includes a housing 30 that is adapted to be inserted inside the string 12 extending within the wellbore 13. The string 12 can be embodied as any of the above-described strings used in a wellbore operation 10. Such strings 12 are generally constructed to have an inner chamber 29 (shown in FIG. 2) extending laterally inside the length of the string 12, i.e., the string 12 has a hollow chamber extending along its inside length. This inner chamber 29 of the string 12 can generally range in maximum cross-sectional dimension from about 2.2 inches near the repeater 20, to about 3.5 inches. When the string 12 is cylindrically shaped, the cross-sectional dimension will be the diameter of the string 12. Typically, the diameter of the inner chamber 20 of the string will be about 2.75 inches. The term "about" as used herein takes into account changes in size due to accuracies in actual implementations and refers to variations not more than ±2%. The housing 30 of the data retrieval device 28 is preferably adapted to be small enough to fit within the inner chamber 29 of the string 12 utilized in the wellbore operation 10. The housing 30 of the data retrieval device 28 can be sized such that the data retrieval device 28 can be positioned inside the inner chamber 29 of the string 12. For example, in one embodiment the housing 30 has a diameter between about 1.5 inches to about 2.1 inches.

Even more particularly, the data retrieval device 28 is adapted to be inserted inside the string 12 and extended at least a portion of the length of the string 12 so far as is needed to establish communication with the downhole telemetry module 18 and/or one or more of the repeaters 20.

This is in contrast to the downhole telemetry module 18 and/or the one or more repeaters 20 which are generally a part of the string 12, i.e., the module 18 and/or repeater 20 generally include two adjacent sections of the string 12 that are separated by the gap or non-conductive insert. Because the data retrieval device 28 is adapted to be inserted inside the string 12, inserting the data retrieval device 28 into the string 12 can be done without removing the string 12 from the wellbore 13. That is, the data retrieval device 28 being adapted to fit inside the string 12 permits the establishment of the communication via the downhole to surface telemetry system 17 without having to remove the string 12 and add one or more additional repeaters 20 spaced closer together to overcome unforeseen or unanticipated formations which would otherwise disrupt the EM signals of the downhole to surface telemetry system 17. Insertion and operation of the data retrieval device 28 inside the string 12 results in greatly enhanced communication capabilities for the wellbore operation 10 all the while significantly reducing time and expense normally associated with extracting and reconfiguring the string 12 to overcome unforeseen changes or properties of the formation 14 or conditions of the wellbore 13.

The data retrieval device 28 further includes a communication device 39 having a first conductive terminal 40, a second conductive terminal 42, and a non-conductive gap 44. The data retrieval device 28 further includes a connection port 46 and an electronic module 50. The non-conductive gap 44 is positioned on the housing 30 between the first and second conductive terminals 40 and 42 to thereby electrically isolate the first conductive terminal 40 from the second conductive terminal 42. The conductive terminals 40 and 42 can be formed of any suitable material which operates to detect the EM signal propagating along the string 12 as a part of the downhole to surface telemetry system 17. Examples of such materials include steel alloy, such as 4130 Modified, 4140, or API SCT T-95, or the like. The term "on" as used herein is a function word to indicate a source of attachment or support.

The non-conductive gap 44 is positioned on the housing 30 between the first and second conductive terminals 40 and 42. More particularly, the non-conductive gap 44 is attached or supported by the housing and operates to electrically isolate the first conductive terminal 40 from the second conductive terminal 42. As would be understood in the art, electrically isolating the first and second conductive terminals 40 and 42 permits the electronic module 50, discussed in greater detail below, to determine and utilize the difference of potential created by the EM signal of the downhole to surface telemetry system 17 propagating along the string 12 and received by the first and second conductive terminals 40 and 42. The non-conductive gap 44 can be constructed of any suitable material that operates to provide electrical isolation. In one embodiment, the non-conductive gap 44 is implemented as a non-conductive coating 44a and a sleeve 44b. The non-conductive coating 44a extends between the first conductive terminal 40 and the second conductive terminal 42 and in one embodiment is made of a ceramic epoxy material. The sleeve 44b is preferably separate from the coating 44a and can be formed of a fiberglass material or poly(ether ether ketone), i.e., "PEEK", which is a semicrystalline thermoplastic polymer which melts at around 350° C. at atmospheric pressure, and is highly resistant to thermal degradation. As discussed below, and shown in FIG. 2A, the first and second conductive terminals 40 and 42 can be connected together using threads with the coating 44a extending over the threads to isolate the first and second conductive terminals 40 and 42 from each other. The sleeve 44b can be applied either before or after the first and second conductive terminals 40 and 42 are connected together.

The connection port 46 is positioned on the housing 30 and is adapted to be connected to a line 48 that can be used to lower the data retrieval device 28 into and out of the string 12. The line 48 can be embodied as a wireline, slickline, and/or other mechanisms known in the art that are designed to convey the data retrieval device 28 into or out of the string 12. When the line 48 is a wireline, wiring is provided within the wireline to transmit signals between the surface and the data retrieval device 28. A wireline generally consists of a composite structure containing electrical conductors in a core assembly which are encased in spirally wrapped armor wire. Typically, wireline can be used in applications where it facilitates the transportation of power and information (communication) between downhole equipment, e.g., the data retrieval device 28, and equipment at the surface of the well. If the line 48 is embodied as a wireline, the connection port 46 would include necessary connections permitting communication of the power and information between the surface and the data retrieval device 28.

Although a wireline provides certain advantages, wireline can also be more complex and more expensive to operate. Therefore, the connection port 46 of the data retrieval device 28 can also be adapted to be lowered into the string 12 via a line 48 that is embodied as a slickline. A slickline is mainly used to transport hardware into and out of the wellbore 13. Slickline, designed primarily for bearing loads, is of much simpler construction and does not generally have electrical conductors like those used in wireline. Instead, slickline is a high quality length of wire which can be made from a variety of materials, (from mild steel to alloy steel) and is produced in a variety of sizes. When the data retrieval device 28 is lowered into the string 12 via a slickline, the slickline can then optionally be disconnected from the data retrieval device 28 so that the device 28 can be left downhole to operate as a data logger, which is discussed in more detail below.

The electronic module 50 is adapted to be supported by the housing. The electronic module 50 is further adapted to communicate with the downhole to surface telemetry system 17 via the first and second conductive terminals 40 and 42. That is, the electronic module 50 is in electrical communication with the first and second conductive terminals 40 and 42 such that a difference of potential between the first and second conductive terminals 40 and 42 can be detected, measured, and processed by the electronic module 50. Generally, the electronic module 50 includes circuitry similar to that found in traditional telemetry systems that operate to establish communication with the downhole to surface telemetry system 17, decode, and, if necessary, process and store the information being transmitted via the downhole to surface telemetry system 17. The electronic module 50 can include active and passive components; micro-controllers, microprocessors, logic circuits and the like; as well as additional circuitry and/or conductors, that permit the electronic module 50 to receive the EM signals from the first and second conductive terminals 40 and 42, decode the information contained in the EM signals, and process and/or store the information in accordance with the presently disclosed and claimed concepts. The electronic module 50 may also be adapted to communicate with the downhole to surface telemetry system 17 by entering or programming software, and/or use-specific data, and/or site-specific data to use in communicating with the repeater 17 and/or the downhole telemetry module 18. Although a variety of different configurations and/or combinations of such circuitry are possible, each is considered within the scope of the presently disclosed and claimed concepts. Therefore, no further description of the electronic module 50 is deemed necessary.

When the data retrieval device 28 is lowered into the string 12 via the line 48 embodied as a wireline, the electronic module 50 can also include additional circuitry that permits the data retrieval device 28 to communicate with the surface equipment via the wireline using wireline communication protocols. Such wireline communication protocols, and the associated circuitry needed to communicate via those protocols are readily understood in the art and therefore no further description is provided.

When the data retrieval device 28 is lowered into the string 12 via the line 48 embodied as a slickline, the data retrieval device 28 can include additional features adapted to permit the data retrieval device 28 to operate independently and function as a well logger, i.e., to perform logging operations.

Generally, well logging involves deployment of a downhole tool or instrument into the wellbore 13 to collect various downhole measurements, such as density, resistivity, etc., at various depths. This information is then stored on the logger in one or more memory modules. Once the logger is removed from the wellbore 13, the data is then downloaded and/or processed to ascertain the measurements.

When the data retrieval device 28 is deployed into the string 12 using a slickline, the data retrieval device 28 can further include a power supply 52 (shown in phantom) supplying power to the electronic module 50. The power supply 52 can be embodied as one or more batteries, a device that converts motion to electricity, or combinations thereof. The data retrieval device 28 can also include one or more memory modules 54 (shown in phantom) that are adapted to store the information received from the downhole to surface telemetry system 17. Circuitry necessary to implement the power supply 52 and the one or more memory modules 54 are also well known in the art and therefore no further description is provided.

Referring to FIG. 2a, shown therein is one embodiment of the data retrieval device 28. In particular, FIG. 2a generally shows the data retrieval device 28 wherein the electronic module 50 is positioned on the inside of the data retrieval device 28, i.e., the housing 30 of the data retrieval device 28 forms an inner chamber housing the electronic module 50 and/or additional components. However, it should be understood that a variety of other configurations and/or embodiments of the data retrieval device 28 are also considered within the scope of the presently disclosed and claimed concepts.

In this embodiment, the data retrieval device 28 can be embodied as a plurality of individual pieces that are adapted to be secured or otherwise fitted together to form the data retrieval device 28 prior to insertion into the string 12. For example, the first conductive terminal 40 can be embodied as a unitary piece having a first end 56 and a second end 57 wherein the connector port 46 can be positioned on the first end 56. The second conductive terminal 42 can also be embodied as a unitary piece having a first end 61 and a second end 62. The first conductive terminal 40 and the second conductive terminal 42 can be designed with mating profiles. Examples of such profiles include, but is not limited to, threads, quick-connects, compression fittings, and the like.

In other examples, the data retrieval device 28 can be constructed wherein the housing 30 is a solid unitary structure rather than a tubular structure having the herein described components supported on the outside of the housing 30. In addition, although the first and second conductive terminals 40 and 42 are described as unitary structures, this does not need to be the case. In particular, the first and second conductive terminals 40 and 42 can be embodied as conductive bands positioned on the outside of the housing 30 and connected to the electronic module 50 via conductors and/or wires. Additionally, the housing 30 can be manufactured from non-conductive materials to thereby form the non-conductive gap 44, i.e., the material forming the housing 30 also forms the non-conductive gap 44 electrically isolating the first and second conductive terminals 40 and 42. Additionally, in this embodiment, the electronic module 50 and connector port 46 can be positioned on either the inside and/or outside of the housing 30 and supported thereby. Alternatively, the electronic module 50 and/or connector port 46 can be reset within a groove or recessed portion of the housing 30 to thereby maintain a smooth outer surface of the housing 30. Other variations of the embodiment formed as a solid, unitary structure are further contemplated within the scope of the presently disclosed and claimed concepts.

As would be understood in the art, in the embodiment wherein the data retrieval device 28 is embodied as a plurality of individual pieces, the electronic module 50 and its associated conductors and/or wires can be within the structures to as to provide electronic communication as needed.

Figure 2B:
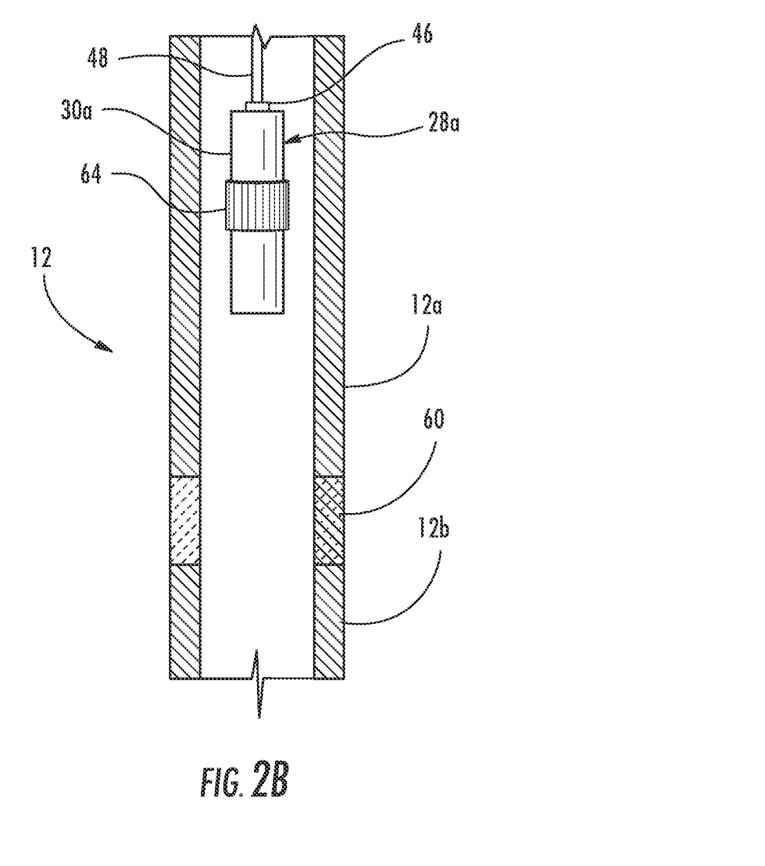
FIG. 2b depicts a diagrammatic view of another embodiment of the data retrieval device shown in FIG. 2.

Referring now to FIG. 2B, shown therein is another embodiment of a data retrieval device 28a which is identical in construction and function as the data retrieval device 28 discussed above, with the exception that the data retrieval device 28a includes a communication device adapted to work on the principal of inductive loop coupling. In this embodiment, the communication device preferably includes one or more inductive coil 64 positioned around a housing 30a for receiving the electromagnetic signals from the repeater 20 or the downhole telemetry module 18. More particularly, the data retrieval device 28a is positioned in the string 12 an effective distance from the downhole telemetry module 18 or one of the repeaters 20 to thereby establish communication with the telemetry system 17. The effective distance can vary, but will usually be less than 500 meters so that the electromagnetic signals will be received with sufficient strength to be decoded. A current flowing in the string 12 due to the propagation of the electromagnetic signal by the repeater 20 or the downhole telemetry module induces a corresponding current with the same signal characteristics in the inductive coil 64 of the data retrieval device. The current signal induced in the inductive coil 64 is detected and measured by the electronic module 50 which is adapted to decode the current signal to thereby retrieve the information encoded therein. The electronic module 50 is further adapted to transmit the information to the surface via the wireline and/or store the information in one or more memory modules for retrieval once the data retrieval device is recovered to the surface. Alternatively one or more than one of the data retrieval device 28a can be positioned on a slickline to ensure communication to surface, for example, in the case where the data retrieval device 28a is effectively replacing a broken repeater 20.

In one embodiment, the inductive coil 64 can be implemented as a toroid positioned around the housing 30a. The housing 30a can be formed of a metallic pipe, for example, in order to collect the electromagnetic signal. The toroid can be made of a ring-shaped metallic core (e.g., ferrite, mumetal, nano-crystalline material or the like) around which wire is coiled to make an inductor.

The data retrieval device 28*a* can also be provided with a non-conductive protective housing (not shown) to electrically isolate the housing 30*a* from the drill string 12. Alternatively or in addition to the non-conductive housing, the data retrieval device 28*a* may include a non-conductive stand-off portion to guard against contact with the drill string 12.

Figure 3:
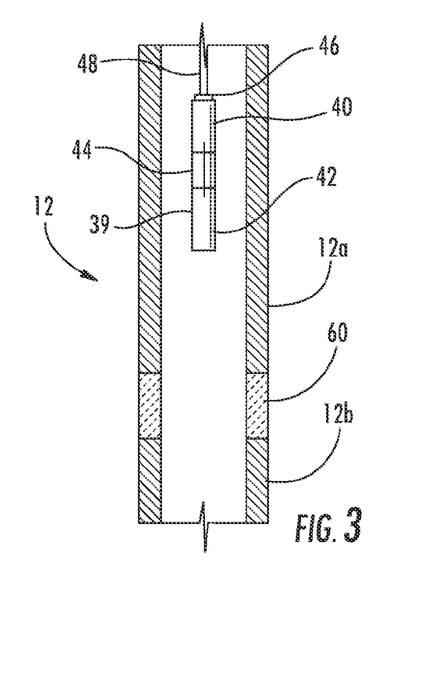
FIG. 3 depicts a diagrammatic view of the data retrieval device positioned in the string wherein a non-conductive gap of the string telemetry system and a non-conductive gap of the data retrieval device are not aligned.
Figure 4:
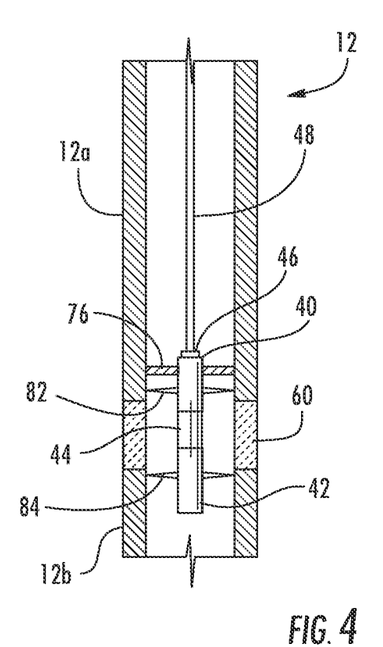
FIG. 4 depicts a diagrammatic view of the data retrieval device positioned in the string wherein the non-conductive gap of the string telemetry system and the non-conductive gap of the data retrieval device are aligned, the data retrieval device including electrodes and being mechanically secured in the string by a retaining member.
Figure 5:
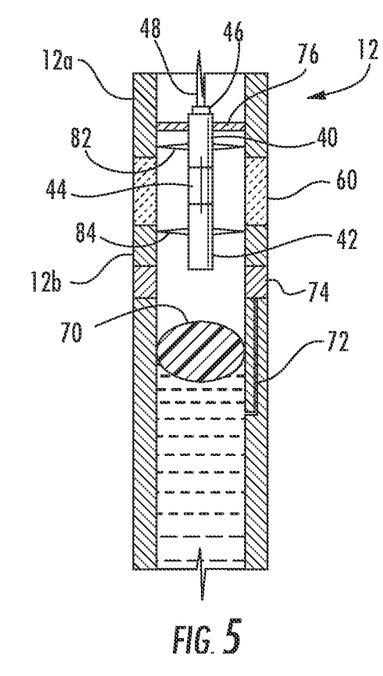
FIG. 5 depicts a diagrammatic view of the data retrieval device positioned above a valve contained in the string wherein the non-conductive gap of the string telemetry system and the non-conductive gap of the data retrieval device are aligned, the data retrieval device including electrodes and being mechanically secured in the string by a retaining member.

Turning now to FIGS. 3-5, shown therein are diagrammatical views of alternate uses and/or embodiments of the data retrieval device 28 constructed in accordance with the presently described concepts. In particular, illustrated therein are varying uses and/or embodiments of the data retrieval device 28 that are directed to downhole positioning schemes of the data retrieval device 28, optional retaining members to mechanically secure the data retrieval device 28 at a zone of interest within the string 12, and optional electrodes connecting the first and second conductive terminals 40 and 42 to the string 12.

With regards to the positioning schemes, i.e., the location within the string 12 to position the data retrieval device 28, FIGS. 3-5 illustrate differing schemes that can be employed. In the first scheme shown in FIGS. 4 and 5, the data retrieval device 28 is positioned in the string 12 so that the non-conductive gap 44 is at least partially aligned with a gap 60 associated with a repeater 20 or the downhole telemetry module 18 of the downhole to surface telemetry system 17. As previously discussed, certain embodiments of the telemetry system include the gap 60, or non-conductive insert, created between adjoining sections of the string 12 (the adjoining pieces being identified by reference numerals 12*a* and 12*b*). In the positioning scheme shown in FIGS. 4 and 5, the data retrieval device 28 is positioned in the string 12 so that the non-conductive gap 44 is at least partially aligned with the gap 60 between the adjoining sections (12*a* and 12*b*) of the string 12 to thereby align the first and second conductive terminals 40 and 42 with the adjoining sections 12*a* and 12*b*, respectively, of the string 12. In certain circumstances, such positioning can enhance the transfer of current generated by the downhole telemetry module into the data retrieval device 28 via the first and second conductive terminals 40 and 42 by permitting the operator to provide control signals to the downhole telemetry module 18 and/or the repeater 20 using the data retrieval device 28 to increase the frequency of the signal used to transmit data.

However, as shown in FIG. 3, such alignment is not necessary for the data retrieval device 28 to establish communication with the downhole to surface telemetry system 17. That is, the data retrieval device 28 can be positioned within the string 12 without aligning the non-conductive gap 44 with the non-conductive gap 60 between adjoining sections 12*a* and 12*b* of the string 12. The first and second conductive terminals 40 and 42 of the data retrieval device 28 are adapted to receive the current propagating within the string 12.

Shown in FIG. 5 is yet another positioning scheme that can be used with the data retrieval device 28. As discussed above, pressure measurements of the well can be used to determine a plurality of well properties. In order to ascertain certain well properties, the well can be closed for a period of time to allow the pressure within the well to equalize. FIG. 5 illustrates one manner in which to achieve the well pressure measurements by using a closed valve 70, a pressure port 72 and one or more gauges 74. In this system, a portion of the hydrocarbons within the well is carried within the string 12 by the pressure port 72 to the one or more gauges 74. The gauges 74 are adapted to measure the well pressure and generate information indicative of the well pressure. The downhole telemetry module 18 (not shown in FIG. 5) is positioned adjacent to the one or more gauges 74 to thereby encode the information indicative of the well pressure and transmit the encoded information by inducing the current into the adjoining sections 12*a* and 12*b* of the string 12. In the positioning scheme shown in FIG. 5, the data retrieval device 28 is positioned above the closed valve 70 such that the non-conductive gap 44 is at least partially aligned with the gap 60 between the adjoining sections 12*a* and 12*b* of the string 12 to thereby align the first and second conductive terminals 40 and 42 with the adjoining sections 12*a* and 12*b* of the string 12. Using this positioning scheme, the current generated by the downhole telemetry module 18 is transferred directly into the first and second conductive terminals 40 and 42 for processing and communication to the surface.

Yet another optional embodiment associated with the data retrieval device 28 is shown in FIGS. 4 and 5. In particular, as shown therein, the data retrieval device 28 further includes at least one retaining member 76 positioned on the housing. The one or more retaining members 76 are adapted to mechanically secure the data retrieval device 28 at a zone of interest within the string 12. A variety of mechanisms and/or systems are known in the art which can secure the data retrieval device 28 at a zone of interest within the string 12. One example of such a system is what is commonly referred to as a retaining member mandrel, a locking dog, or simply retaining member, which acts as an anchor for one or more locking accessories, e.g., plugs, valves, and the like, at a zone of interest within the string 12. Types of such retaining member(s) include slip retaining member(s), collar retaining member(s), nipple retaining member(s), and the like. These retaining member(s) include such features as mating components which permit the data retrieval device 28 to be mechanically secured at a particular zone of interest within the string 12. In one example, the retaining member 76 can be embodied as a landing nipple which is designed to mate with a corresponding retaining dog as part of a locking mandrel located in the string 12, to thereby secure the data retrieval device 28 at the desired zone of interest. It is to be understood that the retaining member 76 can be embodied as any one of the presently known or future developed mechanisms that secure tools, gauges, accessories, and the like at a particular zone of interest within the string 12.

Another alternative embodiment of the data retrieval device 28 includes the utilization of one or more optional electrodes 82 and 84 shown in FIGS. 4 and 5. The optional electrodes 82 and 84 are positioned on the first and second conductive terminals 40 and 42, respectively. The electrodes 82 and 84 are adapted to extend the conductive terminals 40 and 42 so that they are in electrical communication with the adjoining sections 12*a* and 12*b*, respectively, of the string 12. This permits the current generated by the downhole to surface telemetry system 17 and propagating along the string 12 to flow directly into the data retrieval device 28 for processing and/or communication to the surface. The electrodes 82 and 84 can be constructed of a similar material as the conductive terminals 40 and 42, or, alternatively, can be constructed of other materials. In particular, the electrodes 82 and 84 can be constructed of any material that can be adapted to be connected to the first and second conductive terminals 40 and 42 and extend therefrom to contact the adjoining sections 12*a* and 12*b* of the string 12 to place the first and second conductive terminals 40 and 42 in electrical communication with the adjoining sections 12a and 12b.

Figure 6:
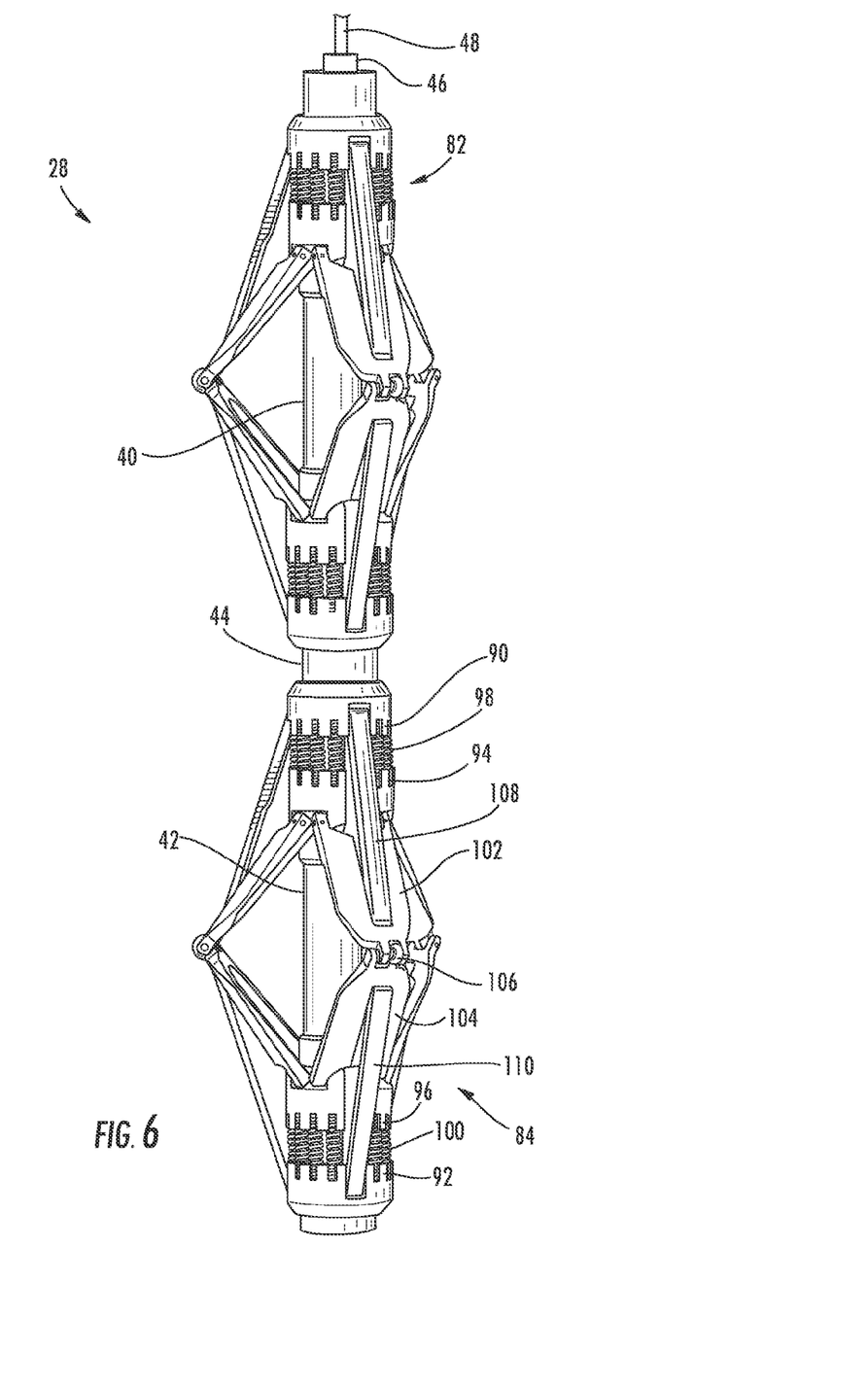
FIG. 6 depicts a perspective view of an alternative embodiment of the data retrieval device wherein the data retrieval device includes one or more electrodes adapted to engage the string and receive electromagnetic signals propagating within the string.

One example of a data retrieval device 28 including one or more electrodes 82 and 84 is shown if FIG. 6. In a preferred embodiment, the electrodes 82 and 84 are constructed substantially the same. Therefore, only the description of electrode 84 is provided herein. However, it is to be understood that electrode 82 includes similar components and operates substantially as electrode 84.

Turning now to FIG. 6, electrode 84 includes an upper fixed ring 90 and a lower fixed ring 92, an upper sliding ring 94 and a lower sliding ring 96, tensioning members 98 and 100, upper arm 102 and lower arm 104, and a rotating member 106. The upper and lower fixed rings 90 and 92 can be embodied as circular rings encircling the outer circumference of the second conductive terminal 42 and are securely affixed to the terminal 42 so as to prevent movement. Although illustrated as rings encircling the terminal 42, it is to be understood that the upper and lower rings 90 and 92 can alternatively be embodied as a plurality of separate fixtures securely affixed to the terminal 42. The upper and lower sliding rings 94 and 96 can also be embodied as circular rings encircling the terminal 42 and positioned a distance from the rings 90 and 92. The sliding rings 94 and 96 are not securely attached to the terminal 42 but are instead adapted to slide along the axial length of the terminal 42. Alternatively, the sliding rings 94 and 96 can be embodied as a plurality of individual fixtures that are positioned on the terminal 42 but are adapted to slide along the axial length of the terminal 42, for example, within a profiled groove disposed in the terminal 42.

The tensioning member 98 connects the upper fixed ring 90 to the upper sliding ring 94 so as to apply a force to the upper sliding ring 94 directing the ring 94 away from the ring 90. That is, the tensioning member 98 is adapted to slide the ring 94 a predetermined distance from the ring 90 in a relaxed state but to permit the ring 94 to slide towards the ring 90 when a force or pressure is applied (as discussed below) to the ring 94. The tensioning member 98 can be embodied as, but is not limited to, a spring, and/or a hydraulic cylinder, and the like. It is to be understood that the tensioning member 100, lower fixed ring 92, and lower sliding ring 96 are similarly connected and are adapted to operate in a substantially similar manner.

The upper arm 102 and lower arm 104 are pivotally attached to the upper sliding ring 94 and the lower sliding ring 96, respectively, and extend a predetermined length therefrom. Common mechanisms of pivotally connecting the upper and lower arms 102 and 104 to the rings 94 and 96, respectively, are known in the art and no further description is provided. The upper and lower arms 102 and 104 are connected together via the rotating member 106 such that the rotating member can be adapted to rotate when in contact with the inside of the string 12. The rotating member 106 can be embodied, for example, as a wheel or other mechanism. More particularly, rotating member can be embodied as a bracket (not shown) that is adapted to pivotally connect the arms 102 and 104 and is also adapted to include, for example, a wheel that is positioned on an outer edge from the device 28 to thereby contact the inner surface of the inner chamber 29 of the string 12 when in use. Although described as including a wheel, the rotating member 106 can alternatively include any other mechanism which permits the member 106 to readily slide or move without obstruction within the string 12.

It is to be understood that the above-described components of the electrode 84 are constructed of material that permits the electrode 84 to be in electrical communication with at least a portion of the string 12. That is, the components can be constructed of a similar material as is used to construct the terminal 42. However, the electrode 84 can be constructed using other materials known in the art which are adapted to perform the herein described functionality.

The electrodes 82 and 84 can further include optional alignment arms 108 and 110 which can be connected between the rings 90 and 92 and the arms 102 and 104, respectively. That is, the arms 108 and 110 can be adapted to pivotally connect to the upper and lower rings 90 and 92 in a manner permitting the arms 108 and 110 to rotate about an axis perpendicular to the rings 90 and 92. At an opposite end, the arms 108 and 110 can be connected in a sliding fashion to the arms 102 and 104, for example, in a profiled groove formed within the arms 102 and 104. It is to be understood that the alignment arms 108 and 110 can be provided to additionally support or maintain alignment of the arms 90 and 92, when necessary. However, alignment of the arms 90 and 92 can be achieved by other mechanisms known in the art and considered within the scope of the presently disclosed and claimed concepts.

In operation, the electrode 84 is positioned on the terminal 42, as described above. When the data retrieval device 28 is to be lowered into the string 12, a force or pressure can be applied to the arms 102 and 104 that operates to compress the tensioning members 98 and 100 forcing the rings 94 and 96 towards the rings 90 and 92, respectively. This operates to pivot the arms 102 and 104 inward towards the terminal 42 such that the outer diameter of the data retrieval device 28 is reduced an effective distance to thereby permit the device 28 to be inserted within the string 12. Once inserted into the string 12, the compressive force is removed from the arms 102 and 104 permitting the arms 102 and 104 to extend outwardly so as to place the rotating member 106 in at least partial contact with the inner surface of the inner chamber 29 of the string 12. Electrode 82 can be operated similarly and performs similar functionality with respect to terminal 40.

In the positioning schemes discussed above wherein the gap 44 is at least partially aligned with the gap 60, the electrodes 82 and 84 permits the terminals 40 and 42 to be in direct contact with the adjacent sections of the string 12 to thereby directly transfer the difference of potential between the adjacent sections of the string 12 to the terminals 40 and 42 of the data retrieval device 28.

Turning now to the operation of the data retrieval device 28, the device 28 is positioned in the string 12 an effective distance from the downhole telemetry module 18 or one of the repeaters 20 to thereby establish communication with the downhole to surface telemetry system 17 operating within the casing 16. The effective distance can vary, but will usually be less than 500 meters, and more preferably is less than 100 meters and most preferably is zero meters, i.e., the gaps 44 and 60 are aligned. The data retrieval device 28 is positioned in the string 12 so that the EM signals of the downhole to surface telemetry system 17 propagating along the string 12 are received by the data retrieval device 28 with sufficient strength to be decoded. The EM signals are received by the data retrieval device 28 by inducing a difference of potential into the first and second conductive terminals 40 and 42. The difference of potential is detected and measured by the electronic module 50 which is adapted to decode the EM signal to thereby retrieve the information encoded therein. The electronic module 50 is further adapted to transmit the information to the surface via the wireline and/or store the information in one or more memory modules for retrieval once the data retrieval device 28 is recovered to the surface.

It should be understood that the components of the inventions set forth above can be provided as unitary elements, or multiple elements which are connected and/or otherwise adapted to function together, unless specifically limited to a unitary structure in the claims. For example, although the conductive terminal 40 is depicted as a unitary element, the conductive terminal 40 could be comprised of multiple discrete elements which are connected together using any suitable assembly, such as a system of threads.

From the above description it is clear that the present invention is well adapted to carry out the disclosed aspects, and to attain the advantages mentioned herein as well as those inherent in the invention. While presently preferred implementations of the invention have been described for purposes of disclosure, it will be understood that numerous changes may be made which readily suggest themselves to those skilled in the art and which are accomplished within the spirit of the invention disclosed.

The invention claimed is:

1. A data retrieval device for communicating between a variable downhole location within a wellbore and a surface location in which a downhole to surface telemetry system is installed, the variable downhole location based on a telemetry condition in the wellbore, the downhole to surface telemetry system configured to communicate between a first telemetry module and a second telemetry module, the second telemetry module positioned downhole and connected to a string positioned within the wellbore, the data retrieval device comprising:
   a housing configured to be positioned inside the string;
   a communication device supported by the housing;
   a connection port positioned on the housing and configured to be connected to a line; and
   an electronic module supported by the housing, the electronic module in communication with the communication device, wherein the electronic module is configured to store and use an identification parameter of the first telemetry module to intercept a signal transmission addressed to the first telemetry module from the second telemetry module via the communication device, the electronic module to operate in place of the first telemetry module based on the identification parameter; and
   wherein the electronic module is configured to establish or re-establish bi-directional communication between the surface location and the second telemetry module in response to a disruption of communication between the surface location and the second telemetry module by the telemetry condition.

2. The data retrieval device of claim 1, wherein the housing further comprises at least one retaining member positioned on the housing, the at least one retaining member configured to mechanically secure the data retrieval device at a zone of interest within the string.

3. The data retrieval device of claim 1 wherein the line is a wireline.

4. The data retrieval device of claim 3, wherein the electronic module further comprises a memory module configured to store data received from the second telemetry module.

5. The data retrieval device according to claim 1 wherein the line is a slickline.

6. The data retrieval device of claim 5 further comprising:
   a power supply providing power to the electronic module, wherein the electronic module further comprises a memory module configured to store data received from the second telemetry module.

7. The data retrieval device according to claim 1 wherein the communication device comprises:
   a first conductive terminal positioned on the housing;
   a second conductive terminal positioned on the housing and spaced apart from the first conductive terminal;
   a non-conductive gap positioned between the first and second conductive terminals to isolate the first conductive terminal from the second conductive terminal.

8. The data retrieval device according to claim 7, wherein the non-conductive gap is constructed of electrically insulating material.

9. A data retrieval method for communicating between a downhole location within a wellbore and a surface location in which a downhole to surface telemetry system is installed, the downhole to surface telemetry system configured to electromagnetically communicate between a downhole telemetry module connected to a string positioned within the wellbore and a surface telemetry module, the method comprising:
   inserting, at a variable downhole location based on a telemetry condition in the wellbore, a data retrieval device with a line into the string such that the data retrieval device is in electromagnetic communication with at least one of the downhole telemetry module and the surface telemetry module of the downhole to surface telemetry system;
   intercepting, via the data retrieval device, a signal transmission addressed to one of the downhole telemetry module or a repeater disposed in the wellbore based on an identification parameter of the one of the downhole telemetry module or the repeater, the data retrieval device to operate in place of the one of the downhole telemetry module or the repeater based on the identification parameter; and
   establishing or re-establishing bi-directional communication between the surface telemetry module and the downhole telemetry module in response to a disruption of communication between the downhole telemetry module and the surface telemetry module by the telemetry condition.

10. The method of claim 9, wherein the data retrieval device includes a housing having at least one retaining member configured to mechanically secure the data retrieval device at a zone of interest within the string and wherein inserting the data retrieval device within the string further comprises:
   positioning the data retrieval device at the zone of interest; and
   securing the data retrieval device at the zone of interest using the at least one retaining member.

11. The method of claim 9 wherein the repeater is a first repeater and the downhole to surface telemetry system comprises:
   a second repeater configured to electromagnetically communicate with at least one of the surface telemetry module and the downhole telemetry module, and wherein the data retrieval device is in electromagnetic communication with the second repeater of the downhole to surface telemetry system.

12. The method of claim 11, wherein the line is a wireline, the method further comprising:
   establishing communication between the surface telemetry module and the second repeater and downhole telemetry module via the wireline and the data retrieval device.

13. The method according to claim 9, wherein the line is a slickline.

14. The method of claim 13, wherein the data retrieval device further comprises a power supply supplying power to an electronic module of the data retrieval device and a memory module configured to store information received from one or more sensors indicative of a wellbore property.

15. The method according to claim 9, further comprising:
testing the communication ability of the downhole to surface telemetry system in real-time prior to inserting the data retrieval device into the string.

16. The method according to claim 9, wherein inserting the data retrieval device is accomplished responsive to the downhole to surface telemetry system not functioning properly.

17. The method according to claim 9, wherein the data retrieval device includes a communication device configured to work on the principal of inductive loop coupling.

18. The method according to claim 9, wherein the data retrieval device includes a communication device comprising:
a first conductive terminal;
a second conductive terminal spaced apart from the first conductive terminal; and
a non-conductive gap positioned between the first and second conductive terminals to isolate the first conductive terminal from the second conductive terminal.

19. A data retrieval system comprising:
first and second telemetry modules, the second telemetry module connected to a string and positioned downhole within a wellbore, the second telemetry module in communication with one or more sensors sensing a wellbore property, the second telemetry module to receive information from the one or more sensors indicative of the wellbore property, wherein the first and second telemetry modules are configured to communicate; and
a data retrieval device positioned inside the string at a variable location based on a telemetry condition in the wellbore, the data retrieval device comprising:
a housing configured to be positioned inside the string;
a communication device supported by the housing;
a connection port positioned on the housing and configured to be connected to a line; and
an electronic module supported by the housing, the electronic module configured to store and use an identification parameter of the first telemetry module to intercept a signal transmission addressed to the first telemetry module from the second telemetry module via the communication device, the electronic module to operate in place of the first telemetry module based on the identification parameter, wherein the electronic module is configured to establish or re-establish bi-directional communication between a surface location relative to the wellbore and the second telemetry module in response to a disruption of communication between the surface location and the second telemetry module by the telemetry condition.

20. The data retrieval system of claim 19, wherein the housing further comprises at least one retaining member positioned on the housing, the at least one retaining member configured to mechanically secure the data retrieval device at a zone of interest within the string.

21. The data retrieval system of claim 19, wherein the line is a wireline.

22. The data retrieval system of claim 21, wherein the electronic module further comprises:
a memory module configured to store data received from the second telemetry module.

23. The data retrieval system according to claim 19, wherein the line is a slickline.

24. The data retrieval system of claim 23 further comprising:
a power supply providing power to the electronic module of the data retrieval device, wherein the electronic module comprises a memory module configured to store data received from the second telemetry module.

25. The data retrieval system according to claim 19, wherein the communication device comprises:
a first conductive terminal positioned on the housing;
a second conductive terminal positioned on the housing and spaced from the first conductive terminal; and
a non-conductive gap positioned between the first and second conductive terminals to isolate the first conductive terminal from the second conductive terminal.

26. The data retrieval system according to claim 25, wherein the non-conductive gap is constructed of electrically insulating material.

27. The data retrieval system according to claim 19, wherein the first and second telemetry modules are a part of a downhole to surface telemetry system configured to communicate between the second telemetry module and a surface telemetry module exclusive of the data retrieval device.

* * * * *